US009753960B1

(12) United States Patent
 Troyanovsky

(10) Patent No.: US 9,753,960 B1
(45) Date of Patent: Sep. 5, 2017

(54) SYSTEM, METHOD, AND COMPUTER PROGRAM FOR DYNAMICALLY GENERATING A VISUAL REPRESENTATION OF A SUBSET OF A GRAPH FOR DISPLAY, BASED ON SEARCH CRITERIA

(71) Applicant: Amdocs Software Systems Limited, Dublin (IE)

(72) Inventor: Alexander Troyanovsky, Gan-Yavne (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 131 days.

(21) Appl. No.: 14/203,398

(22) Filed: Mar. 10, 2014

Related U.S. Application Data

(60) Provisional application No. 61/803,482, filed on Mar. 20, 2013.

(51) Int. Cl.
 *G06F 17/30* (2006.01)
(52) U.S. Cl.
 CPC .. *G06F 17/30321* (2013.01); *G06F 17/30144* (2013.01); *G06F 17/30289* (2013.01); *G06F 17/30292* (2013.01)
(58) Field of Classification Search
 CPC ......... G06F 17/30867; G06F 17/30221; G06F 17/30336; G06F 17/30327;
 (Continued)

(56) References Cited

U.S. PATENT DOCUMENTS 6,144,962 A * 11/2000 Weinberg ................ G06F 11/32
6,237,006 B1 * 5/2001 Weinberg ................ G06F 11/32
 345/419

(Continued)

*Primary Examiner* — Frantz Coby
(74) *Attorney, Agent, or Firm* — Zilka-Kotab, PC

(57) ABSTRACT

A system, method, and computer program product are provided for dynamically generating a visual representation of a subset of a graph for display, based on search criteria. In use, a plurality of first documents corresponding to each of a plurality of nodes associated with at least one graph are generated, wherein each of the plurality of first documents include information corresponding to an associated node of the plurality of nodes. Additionally, a plurality of second documents corresponding to each of a plurality of edges associated with the at least one graph are generated, wherein each of the plurality of second documents include information corresponding to an associated edge of the plurality of edges. Further, the plurality of first documents corresponding to each of the plurality of nodes and the plurality of second documents corresponding to each of the plurality of edges are automatically indexed, wherein the indexing functions to allow the plurality of first documents corresponding to each of the plurality of nodes and the plurality of second documents corresponding to each of the plurality of edges to be searched utilizing at least one search engine. In addition, the plurality of first documents corresponding to each of the plurality of nodes and the plurality of second documents corresponding to each of the plurality of edges are filtered to generate a subset of the plurality of first documents corresponding to each of the plurality of nodes and the plurality of second documents corresponding to each of the plurality of edges, in response to a search query utilizing the at least one search engine. Still yet, a visual representation of a subset of the at least one graph is displayed, the visual representation of the subset of the at least one graph being based on the subset of the plurality of first documents corresponding to each of the plurality of nodes and the (Continued)

plurality of second documents corresponding to each of the plurality of edges.

5 Claims, 6 Drawing Sheets

(58) Field of Classification Search
CPC ......... G06F 17/30958; G06F 17/30321; G06F 17/30144; G06F 17/30289; G06F 17/30292
USPC ........ 707/715, 741–746, 754, 797–798, 805, 707/724, 672; 709/201, 203, 213, 217
See application file for complete search history.

(56) References Cited

U.S. PATENT DOCUMENTS

| | | | | |
|---|---|---|---|---|
| 6,965,569 B1* | 11/2005 | Carolan | ............. | H04N 1/00209 370/238 |
| 7,031,887 B2* | 4/2006 | Jain | ...................... | G06F 9/5066 703/1 |
| 7,076,417 B2* | 7/2006 | Jain | ........................... | G06F 8/10 703/2 |
| 7,299,458 B2* | 11/2007 | Hammes | ............. | G06F 17/5045 716/103 |
| 7,681,182 B1* | 3/2010 | Mistry | ................. | G06F 11/3636 714/25 |
| 7,974,531 B2* | 7/2011 | Bridges | ............... | H04J 14/0227 398/34 |
| 8,180,804 B1* | 5/2012 | Narayanan | ........ | G06F 17/30867 707/798 |
| 8,185,558 B1* | 5/2012 | Narayanan | ........ | G06F 17/30958 707/798 |
| 8,229,921 B2* | 7/2012 | Ramakrishnan | ........ | G10L 15/26 706/45 |
| 8,572,129 B1* | 10/2013 | Lee | ................... | G06F 17/30861 707/798 |
| 8,645,339 B2* | 2/2014 | Kang | ................ | G06F 17/30533 707/693 |
| 8,694,979 B2* | 4/2014 | Rosu | ................. | G06F 17/30958 717/144 |
| 8,694,980 B2* | 4/2014 | Rosu | ................. | G06F 17/30958 717/144 |
| 8,949,232 B2* | 2/2015 | Harrington | ....... | G06F 17/30864 707/732 |
| 9,002,898 B2* | 4/2015 | Narayanan | ........ | G06F 17/30958 707/798 |
| 9,116,780 B2* | 8/2015 | van Gogh | ................. | G06F 8/75 |
| 9,195,673 B2* | 11/2015 | Constantinescu | . | G06F 17/30156 |
| 2007/0022000 A1* | 1/2007 | Bodart | ................... | G06Q 10/10 705/7.38 |
| 2011/0270851 A1* | 11/2011 | Mishina | ............ | G06F 17/30982 707/749 |
| 2012/0162230 A1* | 6/2012 | Nevin, III | ......... | G06F 17/30395 345/440 |
| 2012/0221553 A1* | 8/2012 | Wittmer | ............ | G06F 17/30572 707/722 |
| 2012/0271831 A1* | 10/2012 | Narayanan | ........ | G06F 17/30867 707/741 |
| 2012/0271837 A1* | 10/2012 | Kryger | ............. | G06F 17/30867 707/751 |
| 2013/0024439 A1* | 1/2013 | Reinholdtsen | ......... | G06Q 50/01 707/706 |
| 2013/0066921 A1* | 3/2013 | Mark | ................ | G06F 17/30734 707/794 |
| 2013/0218866 A1* | 8/2013 | Qian | ................. | G06F 17/30696 707/714 |
| 2013/0246425 A1* | 9/2013 | Aleksovski | ........... | G06F 3/0481 707/737 |
| 2014/0040300 A1* | 2/2014 | Narayanan | ........ | G06F 17/30958 707/758 |
| 2014/0089322 A1* | 3/2014 | Garcia | ............. | G06F 17/30867 707/748 |
| 2014/0245233 A1* | 8/2014 | Bentov | ............... | G06F 17/2241 715/853 |
| 2014/0289280 A1* | 9/2014 | Zichterman | ....... | G06F 17/30076 707/797 |
| 2015/0127632 A1* | 5/2015 | Khaitan | ............ | G06F 17/30554 707/722 |

* cited by examiner

SYSTEM, METHOD, AND COMPUTER PROGRAM FOR DYNAMICALLY GENERATING A VISUAL REPRESENTATION OF A SUBSET OF A GRAPH FOR DISPLAY, BASED ON SEARCH CRITERIA

CLAIM OF PRIORITY

This application claims the benefit of U.S. Provisional Application No. 61/803,482, filed Mar. 20, 2013, the entire contents of which are incorporated herein by reference.

FIELD OF THE INVENTION

The present invention relates generally to visual user interaction and, more particularly, to generating a visual representation of a subset of a graph for display.

BACKGROUND

Graphical administration tools allow users to view models of systems, sometimes illustrating the relationships between objects associated with the system. Current graphical administration tools fail to display complex system models in an efficient manner that allows the user to easily understand aspects of the model.

There is thus a need for addressing these and/or other issues associated with the prior art.

SUMMARY

A system, method, and computer program product are provided for dynamically generating a visual representation of a subset of a graph for display, based on search criteria. In use, a plurality of first documents corresponding to each of a plurality of nodes associated with at least one graph are generated, wherein each of the plurality of first documents include information corresponding to an associated node of the plurality of nodes. Additionally, a plurality of second documents corresponding to each of a plurality of edges associated with the at least one graph are generated, wherein each of the plurality of second documents include information corresponding to an associated edge of the plurality of edges. Further, the plurality of first documents corresponding to each of the plurality of nodes and the plurality of second documents corresponding to each of the plurality of edges are automatically indexed, wherein the indexing functions to allow the plurality of first documents corresponding to each of the plurality of nodes and the plurality of second documents corresponding to each of the plurality of edges to be searched utilizing at least one search engine. In addition, the plurality of first documents corresponding to each of the plurality of nodes and the plurality of second documents corresponding to each of the plurality of edges are filtered to generate a subset of the plurality of first documents corresponding to each of the plurality of nodes and the plurality of second documents corresponding to each of the plurality of edges, in response to a search query utilizing the at least one search engine. Still yet, a visual representation of a subset of the at least one graph is displayed, the visual representation of the subset of the at least one graph being based on the subset of the plurality of first documents corresponding to each of the plurality of nodes and the plurality of second documents corresponding to each of the plurality of edges.

DETAILED DESCRIPTION

Figure 1:
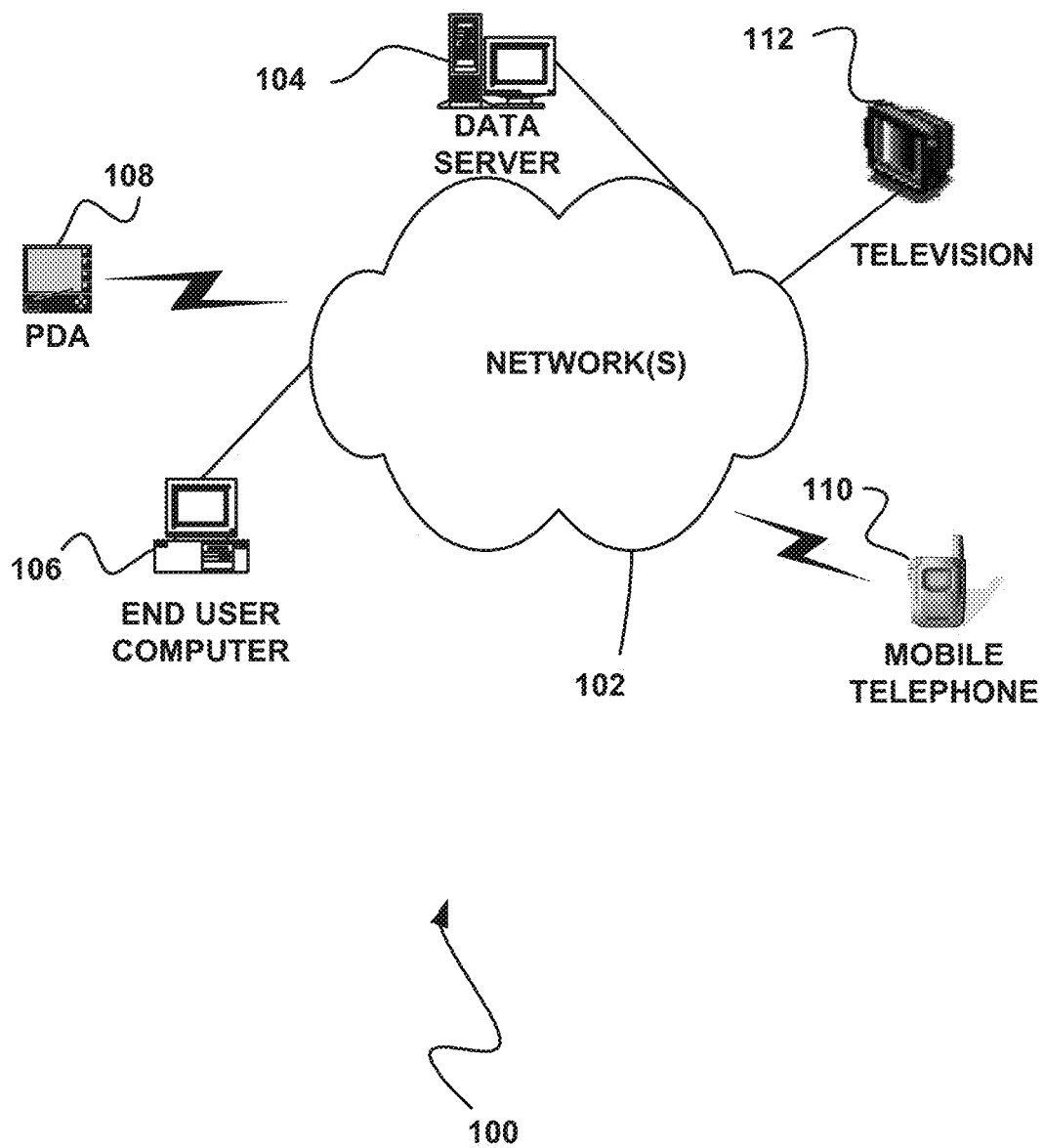
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
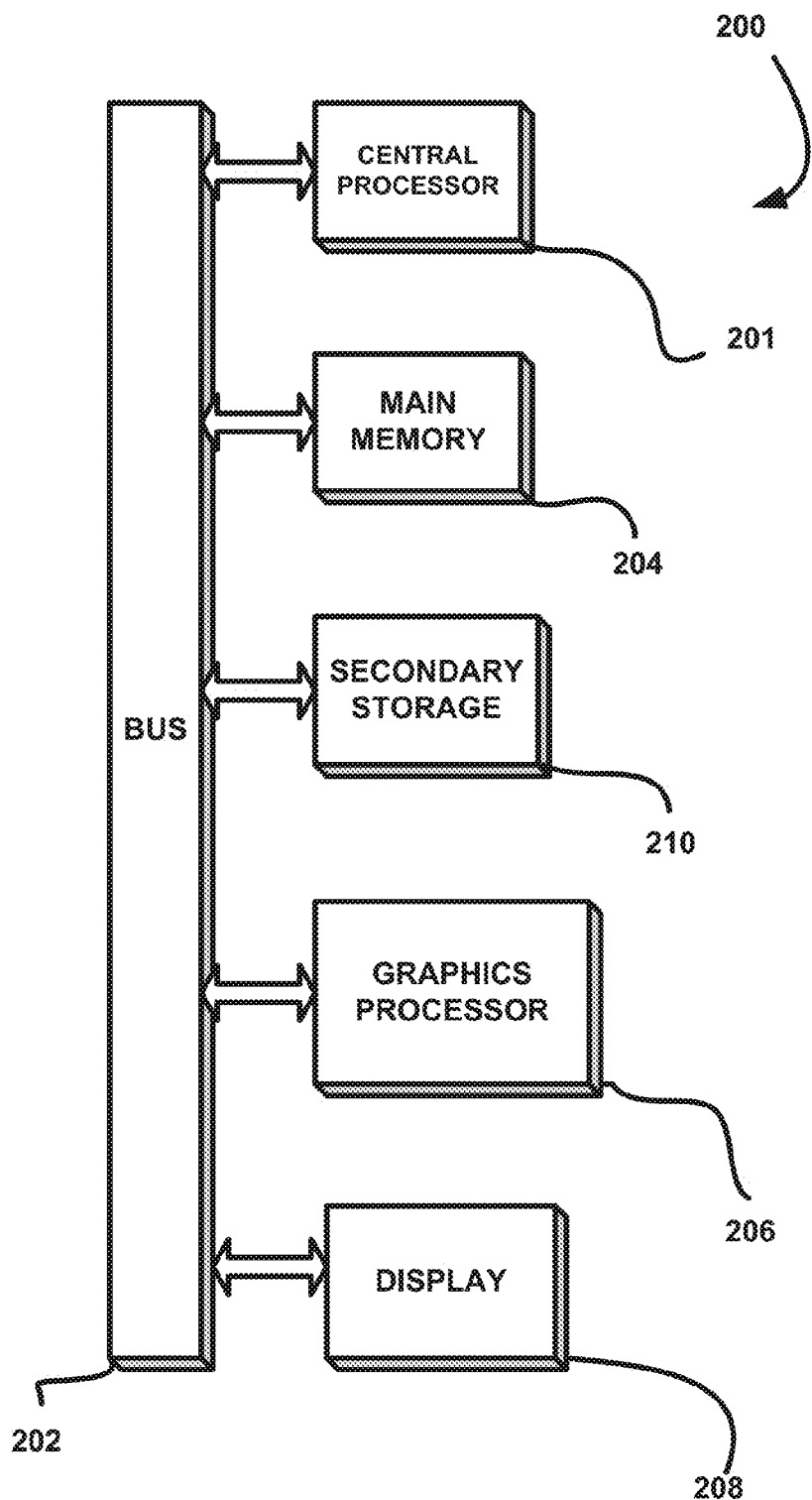
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
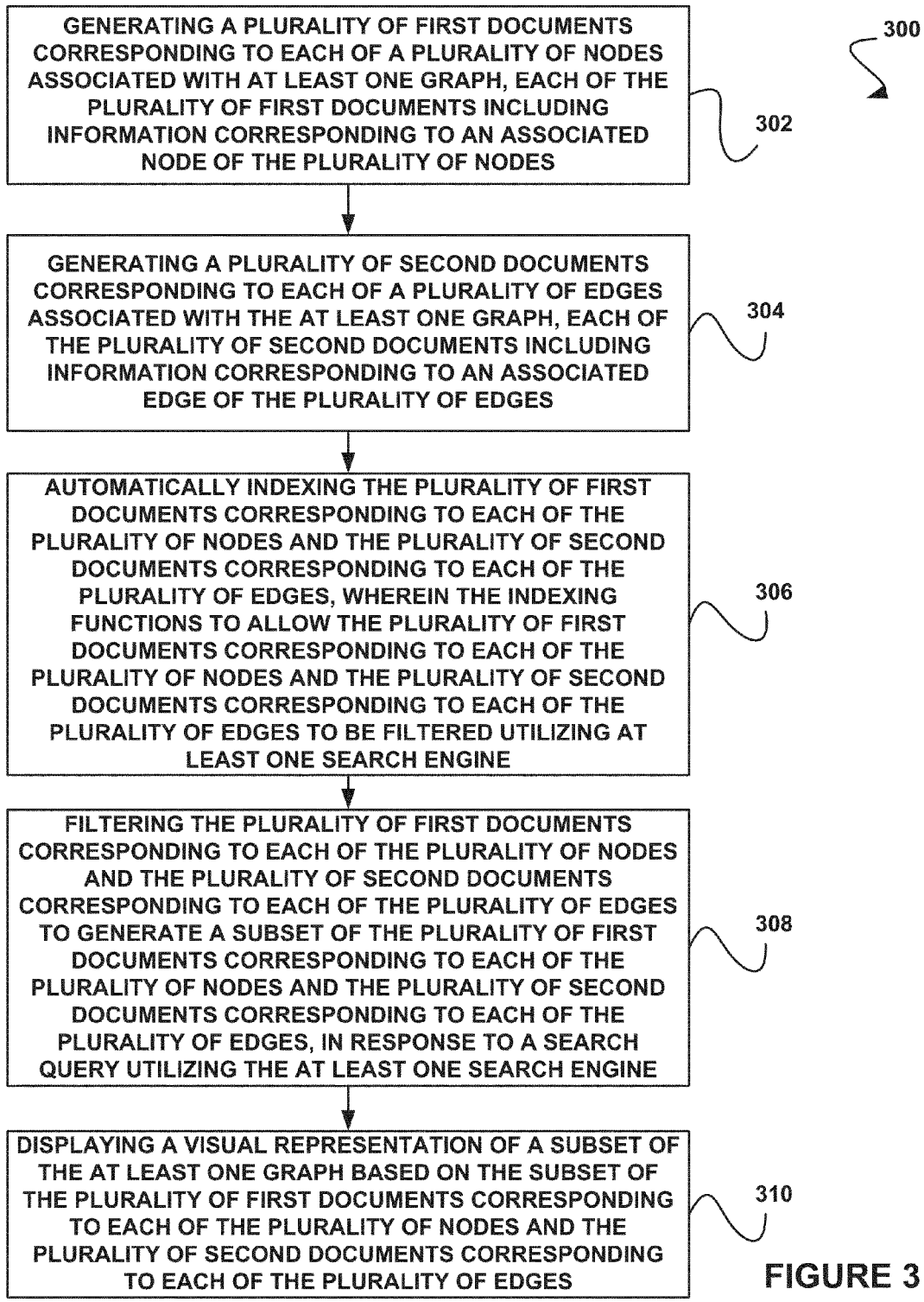
FIG. 3 illustrates a method for dynamically generating a visual representation of a subset of a graph for display, in accordance with one embodiment.

FIG. 3 illustrates a method 300 for dynamically generating a visual representation of a subset of a graph for display, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a plurality of first documents corresponding to each of a plurality of nodes associated with at least one graph are generated. In this case, each of the plurality of first documents include information corresponding to an associated node of the plurality of nodes. See operation 302.

Additionally, a plurality of second documents corresponding to each of a plurality of edges associated with the at least one graph are generated. In this case, each of the plurality of second documents include information corresponding to an associated edge of the plurality of edges. See operation 304.

In the context of the present description, a graph refers to any graphical representation of a system, model, architecture, and/or any other data. For example, in one embodiment, the graph may include a graphical model of a computer system. In another embodiment, the graph may include a graphical model of a software architecture. Of course, in various embodiments, the graph may be associated with any graphical model and/or system.

Further, in the context of the present description, a node refers to any data representation associated with a graph. For example, in one embodiment, the node may include an object associated with the graphical representation. In another embodiment, the node may include a representation of a system component. Additionally, in various embodiments, the node may be associated with a variety of data, such as information associated with an object the node represents, etc. As an example, the node may include data associated with the object type, the object location, the object functionality, ownership of the object, and/or various other information.

The edges associated with the graph refer to any linking capability utilized to indicate a link or connection between various nodes, objects, and/or data associated with the graph. For example, in one embodiment, the edge may include a line linking a first node with a second node. In one embodiment, the edge may include information associated with how the nodes are linked. For example, in one embodiment, edge may be associated with data indicating a type of connection between objects associated with nodes. In another embodiment, the edge may be associated with location information. Of course, various information may be associated with nodes and/or edges.

Further, the first and second documents generated may include any type of document, file, and/or data object that is capable of being indexed. In one embodiment, generating the documents may include translating data associated with nodes and edges to a format (e.g. a document, a data object, etc.) that is capable of being indexed and/or searched. In one embodiment, generating the documents may include translating data associated with nodes and edges to a format that is common to a particular system (e.g. common to an existing search engine, etc.).

As shown further in FIG. 3, the plurality of first documents corresponding to each of the plurality of nodes and the plurality of second documents corresponding to each of the plurality of edges are automatically indexed. In this case, the indexing functions to allow the plurality of first documents corresponding to each of the plurality of nodes and the plurality of second documents corresponding to each of the plurality of edges to be searched utilizing at least one search engine. See operation 306.

In the context of the present description, indexing refers to any technique utilized to facilitate retrieval of documents and/or data objects. For example, in one embodiment, the indexing may include collecting, parsing, and/or storing data to facilitate fast and accurate information retrieval. In one embodiment, documents may be indexed utilizing key words associated with the nodes and/or edges.

The generated documents may include any information associated with the nodes, edges, and/or the graph, etc. For example, in one embodiment, the information corresponding to the associated node of the plurality of nodes may include at least one attribute corresponding to the associated node. In this case, the at least one attribute corresponding to the associated node may include an element type, location information, and/or any other information associate with the node.

Similarly, the information corresponding to the associated edge of the plurality of edges may include at least one attribute corresponding to the associated edge. For example, the at least one attribute corresponding to the associated edge may include connection information for linking at least some of the plurality of nodes, and/or any other information associated with the edge As shown further in FIG. 3, the plurality of first documents corresponding to each of the plurality of nodes and the plurality of second documents corresponding to each of the plurality of edges are filtered to generate a subset of the plurality of first documents corresponding to each of the plurality of nodes and the plurality of second documents corresponding to each of the plurality of edges, in response to a search query utilizing the at least one search engine. See operation 308.

Still yet, a visual representation of a subset of the at least one graph is displayed, the visual representation of the subset of the at least one graph being based on the subset of the plurality of first documents corresponding to each of the plurality of nodes and the plurality of second documents corresponding to each of the plurality of edges. See operation 310. Of course, the subset is further based on the search query.

In one embodiment, the search query may be received from a user. In various embodiments, the search query may include one or more search terms and/or strings of search terms.

In one embodiment, the plurality of first documents corresponding to each of the plurality of nodes and the plurality of second documents corresponding to each of the plurality of edges to may be filtered generate the subset of the plurality of first documents corresponding to each of the plurality of nodes and the plurality of second documents corresponding to each of the plurality of edges, based on the one or more search terms. For example, a user may input key words into a search engine interface. The documents associated with the search may be selected, thus filtering the documents not associated with the search.

In one embodiment, the search query may include the one or more search terms that are received from user input in a user interface associated with the at least one search engine. In this case, a document search engine query including a multiplicity of search criteria corresponding to the one or more search terms may be automatically generated.

Additionally, in one embodiment, generating the subset of the plurality of first documents corresponding to each of the plurality of nodes and the plurality of second documents corresponding to each of the plurality of edges may include selecting the plurality of first documents corresponding to each of the plurality of nodes that comply with the search engine query and selecting the plurality of second documents corresponding to each of the plurality of edges that comply with the search engine query.

The generation and/or display of the visual representation of the subset of the graph may be initiated in different ways. For example, in one embodiment, a request to display at least the subset of the at least one graph may be received. As an option, the request to display the at least the subset of the at least one graph may include receiving the request from a graphical administration tool. Further, in various embodiments, various views of the subset of the at least one graph may be displayed (e.g. based on the edges, etc.).

Utilizing the method 300, a user may display only parts of a graphic model that are relevant to the user. In these cases, the subset of the at least one graph may include a less detailed version of the at least one graph, showing only components relevant to user. In some cases, the subset of the at least one graph may include less nodes than the at least one graph.

In one embodiment, the method 300 may further include saving the subset of the at least one graph in memory. In this case, in one embodiment, saving the subset of the at least one graph in memory may include saving the subset of the plurality of first documents corresponding to each of the plurality of nodes and the plurality of second documents corresponding to each of the plurality of edges. In one embodiment, the saving may be initiated automatically in response to generating a visual representation of the subset of the graph. In another embodiment, the saving may be initiated by a user utilizing a user interface.

Utilizing the method 300, a graphical administration tool may be implemented that allows a user to view and manage systems comprising multiple components having complex relations therebetween. To simplify the complexity that is typically portrayed in complete diagrams of such systems, the method 300 may be utilized to simplify viewing of such complex systems. This allows the user, for example, to define a simplified view of the system, which may be defined to include only components that are currently relevant to the user.

For example, a database administrator may need to view and manage only database related aspects of a runtime environment, while a JavaEE administrator may need to be able to focus on application servers and their clusters. As another example, a software integration engineer may need to be able to view an integration map between various software modules and to receive a logical system view, while an infrastructure group may prefer to view a representation of a physical deployment. Accordingly, utilizing the techniques described herein, the users may use search terms to filter graphical components such that only relevant graphical components and relevant connections are dynamically displayed in graphical format to the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In order to create improved dynamic views of a graph and to provide an improved technique for navigating through a graph, in one embodiment, a system may be implemented that leverages an existing document-based search engine that can index documents and that provides a query language that can be used to search the indexed documents.

Accordingly, in one embodiment, the system may translate a model of a graph into a set of documents that are capable of being indexed by a search engine associated with the system. In one embodiment, the translation may be accomplished by converting every edge and every node of the graph into a document that is recognized by a document search engine. In one embodiment, the fields of the created documents may include attributes of the corresponding edge or node.

Once the graph is indexed, in one embodiment, the search engine's query language may be utilized to create dynamic views of a subset of the graph. For example, every presented view of the graph may be the result of a search query, such as, for example, a drill down from a high level view into a specific element in a query. Thus, the entire graphical presentation may be completely query driven, in one embodiment.

Figure 4:
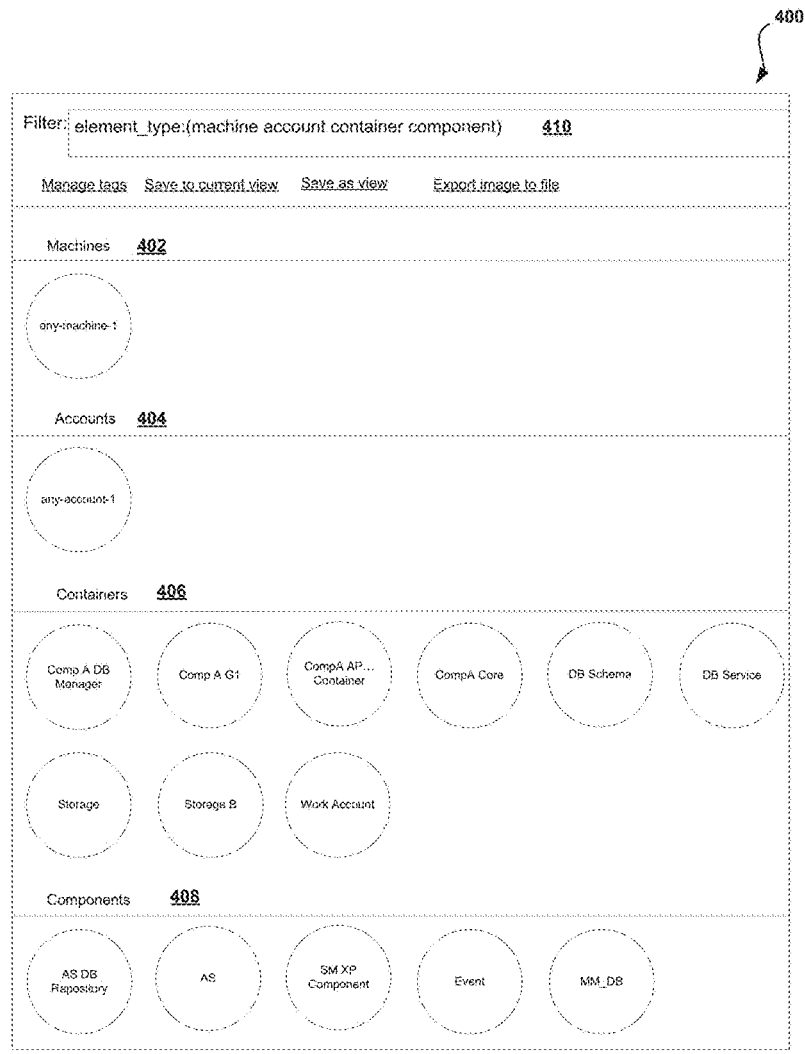
FIG. 4 illustrates a graphical view of a graph subset including all graph elements produced by a corresponding search query, in accordance with one embodiment.

FIG. 4 illustrates a graphical view 400 of a graph subset including all graph elements produced by a corresponding search query, in accordance with one embodiment. As an option, the graphical view 400 may be implemented in the context of the details of FIGS. 1-3. Of course, however, the graphical view 400 may be implemented in the context of any desired environment. Further, the aforementioned definitions may equally apply to the description below.

As shown in FIG. 4, the graph subset illustrates a visual representation resulting from a search query, in accordance with one example. In this example, a search query of "element_type:(machine account container component)" produces a graphical view comprising all of the component nodes of a disparate computer system. In operation, an element type attribute of each node may be translated into a document field so that a field-based query can use the element type attribute to retrieve all documents that contain element type with values such as, machine, account, container, or component, as in the current example.

As shown, in this case, the search query caused the display of a graph subset including nodes associated with machines 402, accounts 404, containers 406, and components 408. As shown further, the search query may be entered into a search query interface 410. Of course, depending on the search engine utilized, various search queries, key words, and/or formats may be appropriate.

Figure 5:
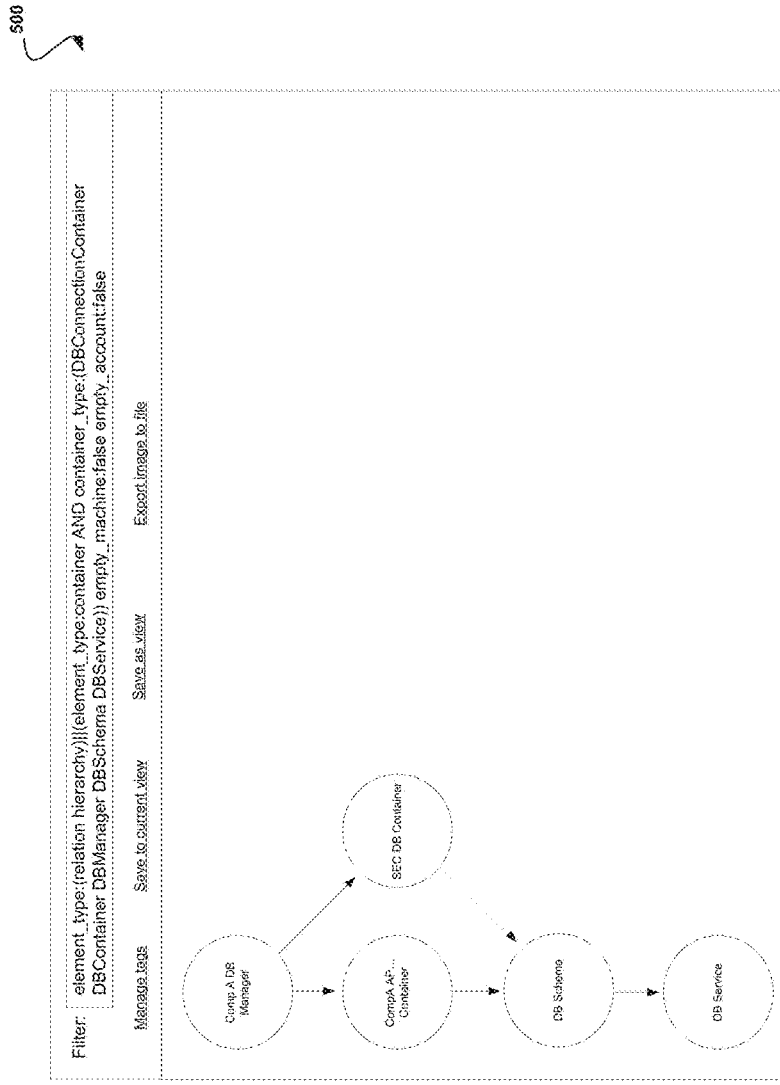
FIG. 5 illustrates a graphical view of a graph subset including all database-related graph elements produced by a corresponding search query, in accordance with one embodiment.

FIG. 5 illustrates a graphical view 500 of a graph subset including all database-related graph elements produced by a corresponding search query, in accordance with one embodiment. As an option, the graphical view 500 may be implemented in the context of the details of FIGS. 1-4. Of course, however, the graphical view 500 may be implemented in the context of any desired environment. Further, the aforementioned definitions may equally apply to the description below.

As shown in this example, a specific search query is capable of producing a graphical view of a graph subset including all nodes and edges (e.g. relationships, etc.) associated with the query. In this example, a search query of "element_type:(relation hierarchy) II (element_type:container AND container_type:(DBConnectionContainer DBContainer DBManager DBSchema DBService)) empty_machine:false empty_account:false" produced a graphical view comprising all database elements and all the relations between database-related graph elements.

Figure 6:
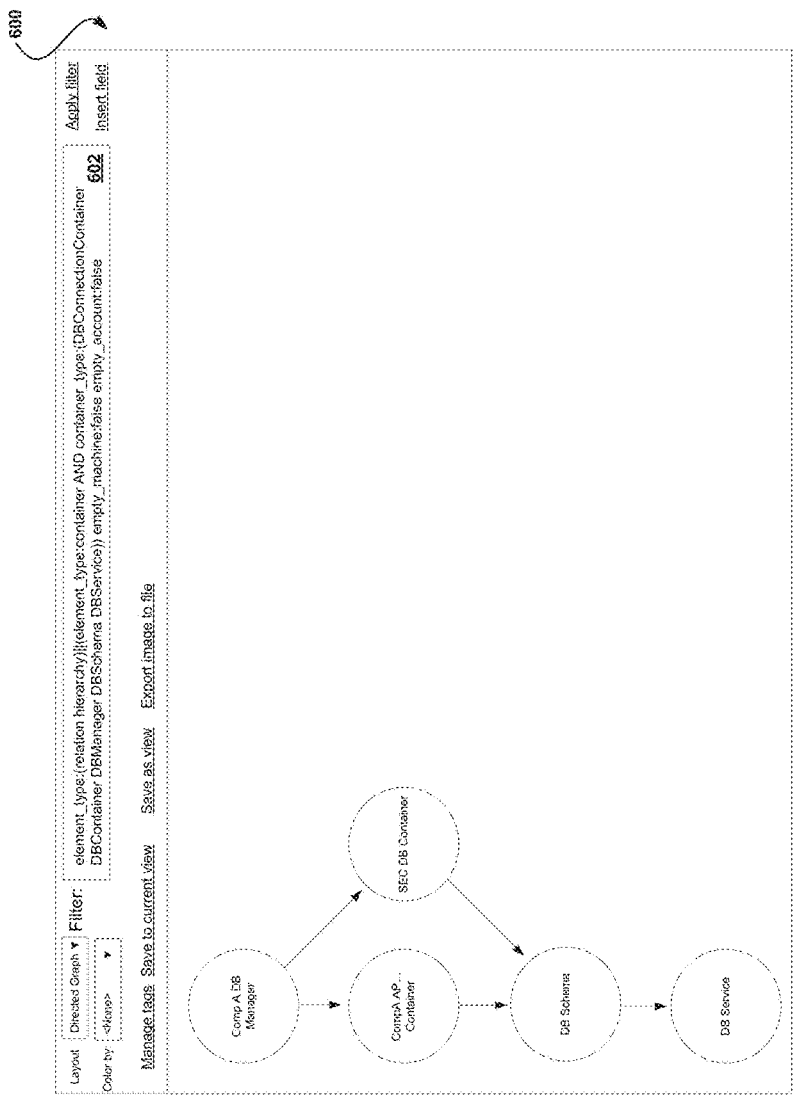
FIG. 6 illustrates a graphical view of a result of a specific software component drill down action that resulted in a view containing all the elements related to that component, in accordance with one embodiment.

FIG. 6 illustrates a graphical view 600 of a result of a specific software component drill down action that resulted in a view containing all the elements related to that component, in accordance with one embodiment. As an option, the graphical view 600 may be implemented in the context of the details of FIGS. 1-5. Of course, however, the graphical view 600 may be implemented in the context of any desired environment. Further, the aforementioned definitions may equally apply to the description below.

As shown in FIG. 6, in one embodiment, a search query may be automatically generated when a user selects a node in a graph or graph subset. In this case, selecting a node may indicate the user desires to "drill-down" into a specific component.

For example, a search query of "(element_type:container AND (parent_of:"CompA/id" OR owner_component: "CompA/id")) element_type:(relation hierarchy) (element_type:contrib AND component:"CompA/id") hosting_machine:true hosting_account:true" may be atomically created and presented in a search query interface 602 as a result of a user clicking on a node "CompA" to drill down into it. In this example, the graphical view that is presented as a result contains all "container" elements that have "CompA" as their parent.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for storing, in memory of a system, a graph modeling a computer system architecture, the graph having:
   (a) a plurality of nodes each representing a different object that is a component within the computer system architecture, each of the nodes including data describing the object represented by the node, the data being associated with a type of the object represented by the node, a location of the object represented by the node, a functionality of the object represented by the node, and ownership of the object represented by the node; and
   (b) a plurality of edges connecting the nodes with each of the edges representing a different connection between different pairs of the objects, wherein each of the edges includes data describing the connection represented by the edge, the data indicating a type of the connection represented by the edge and the data being associated with location information;
   computer code for translating, by the system, the graph into a set of documents that are each a file in a format common to a search engine of the system and that are each capable of being indexed by the system, the translating including:
      generating a plurality of first documents by converting each one of the nodes of the graph into a separate first document having fields that include the data in the node that describes the object represented by the node, and
      generating a plurality of second documents by converting each one of the edges of the graph into a separate second document having fields that include the data in the edge that describes the connection represented by the edge;
   computer code for automatically indexing, by the system, the plurality of first documents and the plurality of second documents to generate an index that allows the plurality of first documents and the plurality of second documents to be searched utilizing at least one search engine;
   computer code for providing, by the system, the graph for display thereof to a user;
   computer code for receiving, by the system, user input including a selection of one of the nodes in the graph, the user input indicating a request for child nodes of the selected node;
   computer code responsive to the user input for automatically generating, by the system, a search query specifying criteria for the request;
   computer code for executing the search query to filter, by the search engine of the system using the index, the plurality of first documents and the plurality of second documents based on the data included therein to generate:
      a subset of the plurality of first documents generated for the child nodes to the selected node, and
      a subset of the plurality of second documents generated for the edges between the child nodes; and
   computer code for generating, by the system for display thereof, a visual representation of a subset of the graph based on the subset of the plurality of first documents and the plurality of second documents, the visual representation of the subset of the graph showing:
      a subset of the nodes that correspond to the subset of the plurality of first documents, and
      a subset of the edges that correspond to the subset of the plurality of second documents,
   with the subset of the nodes being interconnected by the subset of the edges such that the subset of the graph depicts the child nodes to the selected node and the edges connecting the child nodes.

2. The computer program product of claim 1, further comprising computer code for saving the subset of the graph in the memory.

3. A method, comprising:
   storing, in memory of a system, a graph modeling a computer system architecture, the graph having:
   (a) plurality of nodes each representing a different object that is a component within the computer system architecture, each of the nodes including data describing the object represented by the node, the data being associated with a type of the object represented by the node, a location of the object represented by the node, a functionality of the object represented by the node, and ownership of the object represented by the node; and
   (b) a plurality of edges connecting the nodes with each of the edges representing a different connection between different pairs of the objects, wherein each of the edges includes data describing the connection represented by the edge, the data indicating a type of the connection represented by the edge and the data being associated with location information;
   translating, by the system, the graph into a set of documents that are each a file in a format common to a search engine of the system and that are each capable of being indexed by the system, the translating including:
      generating a plurality of first documents by converting each one of the nodes of the graph into a separate first document having fields that include the data in the node that describes the object represented by the node, and generating a plurality of second documents by converting each one of the edges of the graph into a separate second document having fields that include the data in the edge that describes the of the connection represented by the edge;

automatically indexing, by the system, the plurality of first documents and the plurality of second documents to generate an index that allows the plurality of first documents and the plurality of second documents to be searched utilizing at least one search engine;

providing, by the system, the graph for display thereof to a user, receiving, by the system, user input including a selection of one of the nodes in the graph, the user input indicating a request for child nodes of the selected node;

responsive to the user input, automatically generating, by the system, a search query specifying criteria for the request;

executing the search query to filter, by the search engine of the system using the index, the plurality of first documents and the plurality of second documents based on the data included therein to generate:

a subset of the plurality of first documents generated for the child nodes to the selected node, and a subset of the plurality of second documents generated for the edges between the child nodes; and generating, by the system for display thereof, a visual representation of a subset of the graph based on the subset of the plurality of first documents and the plurality of second documents, the visual representation of the subset of the graph showing:

a subset of the nodes that correspond to the subset of the plurality of first documents, and a subset of the edges that correspond to the subset of the plurality of second documents, with the subset of the nodes being interconnected by the subset of the edges such that the subset of the graph depicts the child nodes to the selected node and the edges connecting the child nodes.

4. A system comprising:

a memory of a computer system; and one or more processing cores of the computer system coupled to the memory that are each configured to:

store, in the memory of the computer system, a graph modeling a computer system architecture, the graph having:

(a) a plurality of nodes each representing a different object that is a component within the computer system architecture, each of the nodes including data describing the object represented by the node, the data being associated with a type of the object represented by the node, a location of the object represented by the node, a functionality of the object represented by the node, and ownership of the object represented by the node; and (b) a plurality of edges connecting the nodes with each of the edges representing a different connection between different pairs of the objects, wherein each of the edges includes data describing the connection represented by the edge, the data indicating a type of the connection represented by the edge and the data being associated with location information;

translate, by the computer system, the graph into a set of documents that are each a file in a format common to a search engine of the computer system and that are each capable of being indexed by the computer system, the translating including:

generating a plurality of first documents by converting each one of the nodes of the graph into a separate first document having fields that include the data in the node that describes the object represented by the node, and generating a plurality of second documents by converting each one of the edges of the graph into a separate second document having fields that include the data in the edge that describes the connection represented by the edge;

automatically index, by the computer system, the plurality of first documents and the plurality of second documents to generate an index that allows the plurality of first documents and the plurality of second documents to be searched utilizing at least one search engine;

provide, by the computer system, the graph for display thereof to a user;

receive, by the computer system, user input including a selection of one of the nodes in the graph, the user input indicating a request for child nodes of the selected node;

responsive to the user input, automatically generate, by the computer system, a search query specifying criteria for the request;

execute the search query to filter, by the search engine of the computer system using the index, the plurality of first documents and the plurality of second documents based on the data included therein to generate:

a subset of the plurality of first documents generated for the child nodes to the selected node, and a subset of the plurality of second documents generated for the edges between the child nodes; and generate, by the computer system for display thereof, a visual representation of a subset of the graph based on the subset of the plurality of first documents and the plurality of second documents, the visual representation of the subset of the graph showing:

a subset of the nodes that correspond to the subset of the plurality of first documents, and a subset of the edges that correspond to the subset of the plurality of second documents, with the subset of the nodes being interconnected by the subset of the edges such that the subset of the graph depicts the child nodes to the selected node and the edges connecting the child nodes.

5. The computer program product of claim 1, wherein the graph is accessible to a plurality of users with different roles, for use by each of the users to use search queries to filter the graph to obtain a subset of the graph that is associated with the role of the user, where:

a database administrator filters the graph to view only database related aspects of a runtime environment within the computer system architecture, a JavaEE administrator filters the graph to focus on application servers and their clusters within the computer system architecture, a software integration engineer filters the graph to view an integration map between various software modules of the computer system architecture and to receive a logical system view of the computer system architecture, and a user in an infrastructure group filters the graph to view a representation of a physical deployment within the computer system architecture.

* * * * *